US008050961B2

(12) United States Patent  
Matsubara

(10) Patent No.: US 8,050,961 B2  
(45) Date of Patent: Nov. 1, 2011

(54) VEHICLE MANAGING METHOD, VEHICLE MANAGING APPARATUS AND VEHICLE MANAGING PROGRAM

(75) Inventor: Takamitsu Matsubara, Toyama (JP)

(73) Assignee: Pure Co. Ltd., Toyama (JP)

( * ) Notice: Subject to any disclaimer, the term of this patent is extended or adjusted under 35 U.S.C. 154(b) by 958 days.

(21) Appl. No.: 12/007,930

(22) Filed: Jan. 17, 2008

(65) Prior Publication Data

US 2008/0208656 A1  Aug. 28, 2008

(30) Foreign Application Priority Data

Jan. 19, 2007 (JP) ................................. 2007-010665  
Jan. 7, 2008 (JP) ................................. 2008-000687

(51) Int. Cl.  
*G06Q 10/00* (2006.01)

(52) U.S. Cl. ....................... 705/7.38; 705/7.39; 705/7.41

(58) Field of Classification Search ....................... 705/29  
See application file for complete search history.

(56) References Cited

U.S. PATENT DOCUMENTS

| | | | | |
|---|---|---|---|---|
| 6,554,183 | B1 * | 4/2003 | Sticha et al. .................. | 235/379 |
| 2002/0082966 | A1 * | 6/2002 | O'Brien et al. ................. | 705/36 |
| 2002/0107833 | A1 * | 8/2002 | Kerkinni .......................... | 707/1 |
| 2004/0260585 | A1 * | 12/2004 | Spangenberg et al. ........... | 705/7 |
| 2007/0083327 | A1 * | 4/2007 | Brice et al. .................... | 701/210 |
| 2008/0040129 | A1 * | 2/2008 | Cauwels et al. ................. | 705/1 |

FOREIGN PATENT DOCUMENTS

JP    2003050886 A    *    2/2003

OTHER PUBLICATIONS

Lee, D., Transit Cost and Performance Measurement, (1989), Transport Reviews, vol. 9, Issue 2, p. 147-170.*  
Tang, H. Miller-Hooks, E., Algorithms for a stochastic selective travelling salesperson problem, Apr. 2005, Journal of the operational research society, Nature Publishing Group, 2005 56/4, p. 439-452.*

* cited by examiner

*Primary Examiner* — M. Thein  
*Assistant Examiner* — Milena Racic  
(74) *Attorney, Agent, or Firm* — Louis Woo

(57) ABSTRACT

A method is disclosed for performing comprehensive management for vehicles owned by clients, and according to this method, a vehicle managing apparatus, a client terminal, a workshop terminal and a store terminal are connected via a communication network, and the vehicle managing apparatus includes information acceptance unit, maintenance period calculation unit, business efficiency analyzation unit and information providing unit. First, maintenance history information for vehicles, automotive accessories purchase history information, vehicle operating record information and business performance information for a client, entered by the workshop terminal or the store terminal are received. Sequentially, a maintenance period for a vehicle is calculated based on the above information, and business efficiency is obtained based on the above information. Then, maintenance period calculation results and the business efficiency analysis results are transmitted to the client terminal.

6 Claims, 12 Drawing Sheets

FIG. 3A

MANAGEMENT INFORMATION — [DISPLAY]
△△△  12-34 — [DISPLAY]
×××  56-78 — [DISPLAY]
⋮  ⋮  ⋮

22 — [OIL CHANGE PERIOD LIST]
[INSPECTION PERIOD LIST]

CATEGORIZED TOTAL
DATE OF START — 06/10/01
DATE OF END — 06/10/31
PURCHASES OF INDIVIDUAL CARS TOTAL — [CATEGORIZED TOTAL]
HISTORIES OF ALL CARS — [LIST]
△△△  12-34 — [LIST]
×××  56-78 — [LIST]
⋮  ⋮  ⋮

CLIENT MANAGEMENT INFORMATION

| CLIENT NUMBER | 0000000000 |
|---|---|
| CREDIT & POINT CARD | 0000000000 |
| PERSON IN CHARGE (1) | ○○ ○○ |
| PERSON IN CHARGE (2) | ○○ ○○ |
| POSTAL CODE | 9XX-XXXX |
| ADDRESS | ○○○○1-1-1 |
| PHONE NUMBER | 076-XX-XXXX |
| FAX NUMBER | 076-XX-XXXX |
| EMAIL ADDRESS | abc@xxx.co.jp |
| ⋮ | ⋮ |
| ⋮ | ⋮ |
| ⋮ | ⋮ |

FIG. 3B

○○○○
MANAGEMENT INFORMATION — [DISPLAY]
△△△  12-34 — [DISPLAY]
×××  56-78 — [DISPLAY]
⋮  ⋮  ⋮

[OIL CHANGE PERIOD LIST]
[INSPECTION PERIOD LIST]

CATEGORIZED TOTAL
DATE OF START — 06/10/01
DATE OF END — 06/10/31
PURCHASES OF INDIVIDUAL CARS TOTAL — [CATEGORIZED TOTAL]
HISTORIES OF ALL CARS — [LIST]
△△△  12-34 — [LIST]
×××  56-78 — [LIST]
⋮  ⋮  ⋮

OIL CHANGE PERIOD LIST

| CAR TYPE | CAR NUMBER | PREVIOUS TIME | NEXT TIME |
|---|---|---|---|
| △△△ | 12-34 | 06/04/03 | 06/07/03 |
| ××× | 56-78 | 06/05/01 | 06/08/01 |
| △△△ | 12-35 | 06/05/15 | 06/08/15 |
| ××× | 66-78 | 06/07/05 | 06/10/05 |
| △△△ | 12-36 | 06/07/11 | 06/10/11 |
| ××× | 76-78 | 06/09/22 | 06/12/22 |
| ⋮ | ⋮ | ⋮ | ⋮ |
| ⋮ | ⋮ | ⋮ | ⋮ |
| ⋮ | ⋮ | ⋮ | ⋮ |

FIG. 4

CLIENT MANAGEMENT INFORMATION LIST

MENU
    BRANCH
EDIT
    GROUP
LIST DISPLAY
    CLIENT MANAGEMENT
CATEGORIZED TOTAL
    [DAY AND TIME OF START]
    [DAY AND TIME OF END]
    COMPANY SALE
    TOTAL 2
    TOTAL 3

| NUMBER | OBJECT | NAME | DETAILS | OIL CHANGE | INSPECTION |
|---|---|---|---|---|---|
| 000001 | INDIVIDUAL | MR. ○○ | SELECT | SELECT | SELECT |
| 000002 | COMPANY | STORE ○○ | SELECT | SELECT | SELECT |
| 000003 | INDIVIDUAL | MS. ○○ | SELECT | SELECT | SELECT |
| 000004 | COMPANY | BANK ○○ | SELECT | SELECT | SELECT |
| 000005 | INDIVIDUAL | MR. ○○ | SELECT | SELECT | SELECT |
| 000006 | COMPANY | TRADING CORP. ○○ | SELECT | SELECT | SELECT |
| 000007 | COMPANY | SUPERMARKET ○○ | SELECT | SELECT | SELECT |
| 000008 | INDIVIDUAL | MR. ○○ | SELECT | SELECT | SELECT |
| 000009 | COMPANY | BOOKSTORE ○○ | SELECT | SELECT | SELECT |
| ⋮ | ⋮ | ⋮ | ⋮ | ⋮ | ⋮ |

FIG. 5

XXX CORPORATION

| CAR 1 | LICENSE REGISTRATION NUMBER: TOYAMA 500 A 0000 | YEAR INITIALLY REGISTERED: INSURANCE NUMBER: 0000000000 |
|---|---|---|

DATA INPUT FORM FOR DECEMBER, 2006 UPDATE

|  | 1ST | 2ND | 3RD | 4TH | 5TH | 6TH | 7TH | 8TH | 9TH | 10TH |
|---|---|---|---|---|---|---|---|---|---|---|
| DISTANCE TRAVELED | 10 | ... |  |  |  |  |  |  |  |  |
| WORKING HOURS | 8 | ... |  |  |  |  |  |  |  |  |
| VEHICLE OPERATING TIME | 2 | ... |  |  |  |  |  |  |  |  |
| ACTUAL WORKING HOURS | 1 | ... |  |  |  |  |  |  |  |  |
| BUSINESS PERFORMANCE | 5,000 | ... |  |  |  |  |  |  |  |  |

MENU | INPUT BUSINESS PERFORMANCE | INPUT INDIVIDUAL BUSINESS DESTINATION | BUSINESS ANALYSIS A | BUSINESS ANALYSIS B | BUSINESS ANALYSIS C | BUSINESS ANALYSIS D | COMPARE DATA

FIG. 6

XXX CORPORATION

| CAR 1 | LICENSE REGISTRATION NUMBER: TOYAMA 500 A 0000 | YEAR INITIALLY REGISTERED: INSURANCE NUMBER: 0000000000 |
|---|---|---|

DATA INPUT FORM FOR DECEMBER, 2006 UPDATE

| BUSINESS DESTINATION NAME | DISTANCE (km) | BUSINESS REVENUE (YEN) |
|---|---|---|
| aaa CO., LTD. | 5 | 50,000 |
| bbb CO., LTD. | 8 | 20,000 |
| ccc CORP. | 20 | 15,000 |
| ddd CO., LTD. | : | : |
| eee CORP. | : | : |

[MENU] [INPUT BUSINESS PERFORMANCE] [INPUT INDIVIDUAL BUSINESS DESTINATION] [BUSINESS ANALYSIS A] [BUSINESS ANALYSIS B] [BUSINESS ANALYSIS C] [BUSINESS ANALYSIS D] [COMPARE DATA]

FIG. 7A

XXX CORPORATION

| ALL VEHICLES | | |
|---|---|---|

| INPUT DATES | OCTOBER 1, 2006 | ~ | OCTOBER 31, 2006 | [SEARCH] |
|---|---|---|---|---|

| REMARKS | REGISTRATION NUMBER | DISTANCE TRAVELED (km) | MAINTENANCE COST (YEN) | MAINTENANCE COST FOR ONE KILOMETER (YEN/km) |
|---|---|---|---|---|
| CAR 1 | TOYAMA 500 A 0000 | 2,000 | 50,000 | 25 |
| CAR 2 | TOYAMA 500 I 0000 | 5,000 | 90,000 | 18 |
| CAR 3 | TOYAMA 500 U 0000 | 2,000 | 50,000 | 25 |
| CAR 4 | TOYAMA 500 E 0000 | 5,000 | 90,000 | 18 |
| CAR 5 | TOYAMA 500 O 0000 | 2,000 | 50,000 | 25 |

[MENU] [INPUT BUSINESS PERFORMANCE] [INPUT INDIVIDUAL BUSINESS DESTINATION] [BUSINESS ANALYSIS A] [BUSINESS ANALYSIS B] [BUSINESS ANALYSIS C] [BUSINESS ANALYSIS D] [COMPARE DATA]

FIG. 7B

| | | | | | |
|---|---|---|---|---|---|
| XXX CORPORATION | | | | | |
| ALL VEHICLES | | | | | |

| INPUT DATES | OCTOBER 1, 2006 | ~ | OCTOBER 31, 2006 | [SEARCH] | |
|---|---|---|---|---|---|
| REMARKS | REGISTRATION NUMBER | DISTANCE TRAVELED (km) | BUSINESS PERFORMANCE (YEN) | MAINTENANCE COST FOR ONE KILOMETER (YEN/km) | BUSINESS PERFORMANCE FOR ONE KILOMETER (YEN/km) |
| CAR 1 | TOYAMA 500 A 0000 | 2,000 | 50,000 | 25 | 225 |
| CAR 2 | TOYAMA 500 I 0000 | 5,000 | 80,000 | 18 | 142 |
| CAR 3 | TOYAMA 500 U 0000 | 2,000 | 50,000 | 25 | 225 |
| CAR 4 | TOYAMA 500 E 0000 | 5,000 | 80,000 | 18 | 142 |
| CAR 5 | TOYAMA 500 O 0000 | 2,000 | 50,000 | 25 | 225 |

[MENU] [INPUT BUSINESS PERFORMANCE] [INPUT INDIVIDUAL BUSINESS DESTINATION] [BUSINESS ANALYSIS A] [BUSINESS ANALYSIS B] [BUSINESS ANALYSIS C] [BUSINESS ANALYSIS D] [COMPARE DATA]

FIG. 7C

| | | |
|---|---|---|
| XXX CORPORATION | | |
| CAR 1 | LICENSE REGISTRATION NUMBER: TOYAMA 500 A 0000 | YEAR INITIALLY REGISTERED: INSURANCE NUMBER: 0000000000 |

| INPUT DATES | OCTOBER 1, 2006 | ~ | OCTOBER 31, 2006 | [SEARCH] | |
|---|---|---|---|---|---|
| BUSINESS DESTINATION NAME | MAINTENANCE COST FOR ONE KILOMETER (YEN/km) | DISTANCE (km) | NUMBER OF VISITS (TIMES) | BUSINESS REVENUE (YEN) | BUSINESS EFFECTIVENESS |
| aaa CO., LTD. | 25 | 5 | 8 | 50,000 | 50.0 |
| bbb CO., LTD. | 25 | 8 | 6 | 20,000 | 16.7 |
| ccc CORP. | 25 | 20 | 15 | 10,000 | 1.3 |
| ddd CO., LTD. | 25 | 5 | 5 | 10,000 | 16.0 |
| eee CORP. | 25 | 10 | 10 | 8,000 | 3.2 |

[MENU] [INPUT BUSINESS PERFORMANCE] [INPUT INDIVIDUAL BUSINESS DESTINATION] [BUSINESS ANALYSIS A] [BUSINESS ANALYSIS B] [BUSINESS ANALYSIS C] [BUSINESS ANALYSIS D] [COMPARE DATA]

FIG. 7D

XXX CORPORATION

ALL VEHICLES

| INPUT DATES | OCTOBER 1, 2006 | ~ | OCTOBER 31, 2006 | | SEARCH |
|---|---|---|---|---|---|
| REMARKS | REGISTRATION NUMBER | OPERATING TIME (H) | WORKING HOURS (H) | OPERATION RATE | MAINTENANCE COST (YEN) | COST EFFECTIVENESS |
| CAR 1 | TOYAMA 500 A 0000 | 40 | 160 | | 2,000 | 33 |
| CAR 2 | TOYAMA 500 I 0000 | 80 | 160 | | 8,000 | 67 |
| CAR 3 | TOYAMA 500 U 0000 | 120 | 180 | | 15,000 | 83 |
| CAR 4 | TOYAMA 500 E 0000 | 100 | 120 | | 10,000 | 67 |
| CAR 5 | TOYAMA 500 O 0000 | 100 | 120 | | 10,000 | 67 |
| | | 440 | 740 | 0.59 | | |

[MENU] [INPUT BUSINESS PERFORMANCE] [INPUT INDIVIDUAL BUSINESS DESTINATION] [BUSINESS ANALYSIS A] [BUSINESS ANALYSIS B] [BUSINESS ANALYSIS C] [BUSINESS ANALYSIS D] [COMPARE DATA]

FIG. 8

XXX CORPORATION

| CAR 1 | LICENSE REGISTRATION NUMBER: TOYAMA 500 A 0000 | YEAR INITIALLY REGISTERED: INSURANCE NUMBER: 0000000000 |
|---|---|---|

| INPUT DATES | OCTOBER 1, 2006 | ~ | OCTOBER 31, 2006 | | SEARCH |
|---|---|---|---|---|---|
| | TOTAL WORKING HOURS (H) | TOTAL ACTUAL WORKING HOURS (H) | TOTAL BUSINESS PERFORMANCE (YEN) | TOTAL VEHICLE EXPENSE (YEN) | COST EFFECTIVENESS |
| DATA FOR TARGET PERIOD | 160 | 45 | 500,000 | 50,000 | 50 |
| PREVIOUS DATA FOR PERTINENT PERIOD | 170 | 50 | 550,000 | 40,000 | 60 |

[MENU] [INPUT BUSINESS PERFORMANCE] [INPUT INDIVIDUAL BUSINESS DESTINATION] [BUSINESS ANALYSIS A] [BUSINESS ANALYSIS B] [BUSINESS ANALYSIS C] [BUSINESS ANALYSIS D] [COMPARE DATA]

FIG. 11A

CHANGE INFORMATION — 202, 201, 200

- CHANGE COMMON PORTION
- [blank]
- CHANGE CLIENT INFORMATION

NORMAL CHARGE
- NEWLY PREPARE
- PREPARE
- DELETE

ARBITRARY CHARGE
- NEWLY PREPARE
- PREPARE
- DELETE

CHECK AUTOMATIC DEDUCTION
- CHECK

UPDATE TRANSFER INFORMATION
- CONVERT

CHANGE COMMON PORTION

[FIX]

| | |
|---|---|
| TYPE CODE | 00 |
| CODE CATEGORY | 1 |
| TRUSTEE CODE | 0000000000 |
| TRUSTEE NAME | XXX CORPORATION |
| BANK NAME FOR TRANSACTION | 0000 |
| BRANCH NUMBER FOR TRANSACTION | XXXX |
| BRANCH NAME FOR TRANSACTION | 000 |
| BRANCH NUMBER FOR TRANSACTION | XXXX |
| SAVINGS TYPE | 1 |
| ACCOUNT NUMBER | 1234567 |

FIG. 11B

CHANGE INFORMATION — 211, 212, 210

- CHANGE COMMON PORTION
- 10000001
- CHANGE CLIENT INFORMATION

NORMAL CHARGE
- NEWLY PREPARE
- PREPARE
- DELETE

ARBITRARY CHARGE
- NEWLY PREPARE
- PREPARE
- DELETE

CHECK AUTOMATIC DEDUCTION
- CHECK

UPDATE TRANSFER INFORMATION
- CONVERT

CHANGE CLIENT INFORMATION

[FIX]

| | |
|---|---|
| CLIENT | 10000001 999 |
| BANK NUMBER FOR DIRECT DEBIT | 0000 |
| BANK NAME FOR DIRECT DEBIT | XXXX |
| BRANCH NUMBER FOR DIRECT DEBIT | 000 |
| BRANCH NAME FOR DIRECT DEBIT | XXXX |
| SAVINGS TYPE | 1 |
| ACCOUNT NUMBER | 1234567 |
| NAME OF DEPOSITOR | XXX CORPORATION |
| DATE OF SETTLEMENT OF ACCOUNTS | 20 |

FIG. 12C

241 — CHANGE INFORMATION panel
240 — SELECT NORMAL CHARGE DATA

CHANGE INFORMATION
[CHANGE COMMON PORTION]
[          ]
[CHANGE CLIENT INFORMATION]
NORMAL CHARGE
 [NEWLY PREPARE]
 [PREPARE]
 [DELETE]
ARBITRARY CHARGE
 [NEWLY PREPARE]
 [PREPARE]
 [DELETE]
CHECK AUTOMATIC DEDUCTION
 [CHECK]
UPDATE TRANSFER INFORMATION
 [CONVERT]

SELECT NORMAL CHARGE DATA

| DEBIT NUMBER | DATE OF SETTLEMENT OF ACCOUNTS | DATE OF DEDUCTION | |
|---|---|---|---|
| 00000002 | 2007/06/20 | 6/30 | [PREPARE] |

FIG. 12D

250 — CHANGE NORMALLY-CHARGED CLIENT
251

CHANGE INFORMATION
[CHANGE COMMON PORTION]
[          ]
[CHANGE CLIENT INFORMATION]
NORMAL CHARGE
 [NEWLY PREPARE]
 [PREPARE]
 [DELETE]
ARBITRARY CHARGE
 [NEWLY PREPARE]
 [PREPARE]
 [DELETE]
CHECK AUTOMATIC DEDUCTION
 [CHECK]
UPDATE TRANSFER INFORMATION
 [CONVERT]

CHANGE NORMALLY-CHARGED CLIENT

DEBIT NUMBER                  00000002  [FIX]
DATE OF SETTLEMENT OF ACCOUNTS  2007/06/20
DATE OF DEDUCTION             6/30      [RETURN]

| CLIENT MANAGEMENT NUMBER | CLIENT NAME | SETTLED |
|---|---|---|
| 10000001 | MR. OO | ☑ |
| 10000002 | STORE OO | ☑ |
| 10000003 | MS. OO | ☑ |
| 10000004 | BANK OO | ☑ |
| 10000005 | MR. OO | ☑ |
| 10000006 | TRADING CORP. OO | ☑ |
| 10000007 | SUPERMARKET OO | ☑ |
| ⋮ | ⋮ | ⋮ |
| ⋮ | ⋮ | ⋮ |

FIG. 12E 260  261

CHANGE INFORMATION

[CHANGE COMMON PORTION]

[CHANGE CLIENT INFORMATION]

NORMAL CHARGE
[NEWLY PREPARE]
[PREPARE]
[DELETE]

ARBITRARY CHARGE
[NEWLY PREPARE]
[PREPARE]
[DELETE]

CHECK AUTOMATIC DEDUCTION
[CHECK]

UPDATE TRANSFER INFORMATION
[CONVERT]

CHANGE NORMAL CHARGE CREDIT SALES

DEBIT NUMBER　　　　　　　　00000002　[FIX]
DATE OF SETTLEMENT OF ACCOUNTS　2007/06/20
DATE OF DEDUCTION　　　　　　6/30　[RETURN]
CLIENT NAME　　　　　　　　　XX STORE

| PURCHASE DATE | PRODUCT | PRICE | SETTLED |
|---|---|---|---|
| 2007/5/22 | AAA OIL | 3000 | ☑ |
| 2007/5/26 | BBB FILTER | 2000 | ☑ |
| 2007/5/29 | CCC OIL | 4000 | ☑ |
| ⋮ | ⋮ | ⋮ | ⋮ |
| ⋮ | ⋮ | ⋮ | ⋮ |

ITEMIZED ACCOUNT

DEBIT NUMBER  00000002
　XX STORE

XXX CORPORATION
XX X-1-1, TOYAMA-SHI
TEL 076-XXX-XXX
FAX 076-XXX-XXX

THE FOLLOWING IS OUR REQUEST FOR YOUR PAYMENT FOR OUR SERVICES

| PURCHASE DATE | PRODUCT NAME | SIZE AND PRODUCT NUMBER | QUANTITY | PRICE |
|---|---|---|---|---|
| 2007/5/22 | AAA OIL | xx-xxx | 1 | 3000 |
| 2007/5/26 | BBB FILTER | xx-xxx | 1 | 2000 |
| 2007/5/29 | CCC OIL | xx-xxx | 1 | 4000 |
| ⋮ | ⋮ | ⋮ | ⋮ | ⋮ |
| ⋮ | ⋮ | ⋮ | ⋮ | ⋮ |
| ⋮ | ⋮ | ⋮ | ⋮ | ⋮ |
| | | | SUBTOTAL | 25000 |

VEHICLE MANAGING METHOD, VEHICLE MANAGING APPARATUS AND VEHICLE MANAGING PROGRAM

TECHNICAL FIELD

The present invention relates to a vehicle managing method, applied for business use vehicles owned by clients, that provides, through a communication network, vehicle maintenance information and business efficiency analysis information, and a vehicle managing apparatus and a vehicle managing program.

BACKGROUND ART

Business use vehicles are indispensable to the performance of business activities, and one to several tens, or several hundreds, of vehicles are owned by companies, in accordance with their relative sizes. In large companies, specified departments may be responsible for the managing of all company vehicles, but in many companies, users are individually entrusted with the managing of the vehicles they operate. However, since most of users possess no technical vehicular knowledge, and since they do not own the vehicles they operate, there is a trend for the maintenance of vehicles to be neglected and the vehicles to be handled carelessly. If vehicles continue to be used in this manner, the vehicles will suffer frequent breakdowns and their service lives shortened, and as a result, maintenance costs will be increased.

On the other hand, for a company that owns and operates a plurality of vehicles for business activities has, as one problem, the fact that maintenance management costs and the operating period for each vehicle are not easily obtained, and therefore, an appropriate number of vehicles required for an operation can not be precisely defined. Especially when individual vehicle maintenance is not performed properly, as described above, an appropriate number of vehicles becomes more and more difficult to determine, and actually, there are many cases wherein more vehicles are owned than are required.

Therefore, in patent document 1 below, a vehicle managing system is proposed according to which a car dealer or a car maintenance workshop performs the centralized management of information related to the vehicles of clients, and for which a web site or email is employed to transmit to a client information such as vehicle maintenance periods. According to this system, the users of vehicles can obtain proper maintenance periods, and thus, use of the business efficiency for the car dealer or the workshop can be improved. Furthermore, in patent document 2, below, a system is proposed, mainly for application for taxis, that is used to collect and manage business performance information for individual vehicles.

Patent Document 1 Japanese Patent Application Publication No. 2002-230423
Patent Document 2 Japanese Patent Application Publication No. 2005-167585

However, although the invention in patent document 1 improves the convenience for vehicle management, it does not contribute, for example, to a reduction in management costs and calculations performed to determine an appropriate number of vehicles. Furthermore, the invention in patent document 2 merely collects information obtained for individual vehicles, and does not perform any specific analysis based on the obtained information.

DISCLOSURE OF THE INVENTION

While taking the above described shortcomings into account, an objective of the present invention is to provide a vehicle managing system that performs the centralized management of information related to business use vehicles owned by companies, and transmits for users of the vehicles necessary information, such as maintenance periods, that can be used to calculate costs required for maintenance, for example, and to analyze the cost effectiveness of individual vehicles, based on data acquired from the use history and the maintenance history for each vehicle and the business performance provided by use of the vehicle, and contributes to an improvement in the management efficiency of a company.

According to a first aspect of the present invention, there is provided a vehicle managing method, which is to be performed by a vehicle managing apparatus that is connected to a client terminal of a client via a communication network, for managing a business use vehicle owned by the client, comprising:

an information acceptance step performed by information acceptance means for receiving maintenance history information for a vehicle and purchase history information for automotive accessories, operating record information for the vehicle that is associated with a predetermined period and business performance information for the client associated with the predetermined period, and for storing the information in a storage device;

a maintenance period calculation step performed by maintenance period calculation means for calculating a maintenance period for the vehicle by employing at least one set of information stored in the storage device, i.e., the maintenance history information, the purchase history information or the operating record information, and for storing the obtained performance as maintenance period calculation results in the storage device;

a business efficiency analyzation step performed by business efficiency analyzation means for analyzing business efficiency by employing at least one set of information stored in the storage device, i.e., the maintenance history information, the purchase history information, the operating record information and business performance information, and for storing the obtained results as business efficiency analysis results in the storage device; and an information providing step performed by information providing means for reading the maintenance period calculation results and the business efficiency analysis results, which are stored in the storage device, and for transmitting these results to the client terminal.

Furthermore, according to a second aspect of the present invention, the vehicle managing method is characterized by comprising:

a charge information acceptance step performed by charge information acceptance means for receiving information concerning a bank account used for automatic deduction and information concerning a date for settlement of accounts, and for storing the information in the storage device;

a money claimed calculation step performed by money claimed calculation means for calculating an amount of money that the client should pay on the basis of at least one information which is either the maintenance history information or the purchase history information both stored in the storage device, and for storing the results as money claimed calculation results in the storage device;

an itemized account issuing step performed by itemized account issuing means for reading the money claimed calculation results stored in the storage device and for transmitting the money claimed calculation results, as an itemized account, to the client terminal; and an automatic deduction step performed by automatic deduction means for reading the money claimed calculation results stored in the storage device, and for preparing direct debit information in order to automatically deduct the money claimed from the bank account of the client.

Further, according to a third aspect of the present invention, a vehicle managing apparatus, which is connected to a client terminal of a client via a communication network to manage a business use vehicle owned by the client, is characterized by comprising:

information acceptance means for receiving maintenance history information for a vehicle and purchase history information for automotive accessories, operating record information for the vehicle that is associated with a predetermined period and business performance information for the client associated with the predetermined period, and for storing the information in a storage device;

maintenance period calculation means for calculating a maintenance period for the vehicle by employing at least one set of information stored in the storage device, i.e., the maintenance history information, the purchase history information or the operating record information, and for storing the obtained performance as maintenance period calculation results in the storage device;

business efficiency analyzation means for analyzing business efficiency on the basis of at least one information, among the maintenance history information, the purchase history information, the operating record information and business performance information all stored in the storage device, and for storing the obtained results as business efficiency analysis results in the storage device; and information providing means for reading the maintenance period calculation results and the business efficiency analysis results, which are stored in the storage device, and for transmitting these results to the client terminal.

In addition, according to a fourth aspect of the present invention, the vehicle managing apparatus is characterized by comprising:

charge information acceptance means for receiving information concerning a bank account used for automatic deduction and information concerning a date for settlement of accounts, and for storing the information in the storage device;

money claimed calculation means for calculating an amount of money that the client should pay on the basis of at least one information which is either the maintenance history information or the purchase history information both stored in the storage device, and for storing the results as money claimed calculation results in the storage device;

itemized account issuing means for reading the money claimed calculation results stored in the storage device, and for transmitting the money claimed calculation results, as an itemized account, to the client terminal; and automatic deduction means for reading the money claimed calculation results stored in the storage device, and for preparing direct debit information in order to automatically deduct the money claimed from the bank account of the client.

According to a fifth aspect of the present invention, a vehicle managing program that manages a business use vehicle owned by the client is characterized by permitting a vehicle managing apparatus, connected to a client terminal of a client via a communication network, to perform:

an information acceptance step (S1) for receiving maintenance history information for a vehicle and purchase history information for automotive accessories, operating record information for the vehicle that is associated with a predetermined period and business performance information for the client associated with the predetermined period, and for storing the information in a storage device;

a maintenance period calculation step (S2) for calculating a maintenance period for the vehicle by employing at least one set of information stored in the storage device, i.e., the maintenance history information, the purchase history information or the operating record information, and for storing the obtained performance as maintenance period calculation results in the storage device;

a business efficiency analyzation step (S3) for analyzing business efficiency on the basis of at least one information among the maintenance history information, the purchase history information, the operating record information and business performance information stored in the storage device, and for storing the obtained results as business efficiency analysis results in the storage device; and an information providing step (S4) for reading the maintenance period calculation results and the business efficiency analysis results, which are stored in the storage device, and for transmitting these results to the client terminal.

Furthermore, according to a sixth aspect of the present invention, the vehicle managing program is characterized by permitting the vehicle managing apparatus to perform:

a charge information acceptance step (S5) for receiving information concerning a bank account used for automatic deduction and information concerning a date for settlement of accounts, and for storing the information in the storage device;

a money claimed calculation step (S6) for calculating an amount of money that the client should pay on the basis of at least one information which is either the maintenance history information or the purchase history information stored in the storage device, and for storing the results as money claimed calculation results in the storage device;

an itemized account issuing step (S7) for reading the money claimed calculation results stored in the storage device, and for transmitting the money claimed calculation results, as an itemized account, to the client terminal; and an automatic deduction step (S8) for reading the money claimed calculation results stored in the storage device, and for preparing direct debit information in order to automatically deduct the money claimed from the bank account of the client.

According to the first, third and fifth aspects, since information related to a maintenance period for a vehicle is transmitted from the vehicle managing apparatus to the client terminal, the client can read the information and have the maintenance performed for the vehicle at an appropriate time. As a result, the service life of the vehicle is extended, and an increase in the maintenance and managing costs for the vehicle can be prevented. Furthermore, since information, such as the number of vehicles to be operated and cost effectiveness, is obtained by analyzing the maintenance history of the vehicles and the business performance obtained by the client and is transmitted to the client, the client can refer to this information to determine an appropriate number of vehicles and a vehicle operating method.

According to the second, fourth and sixth aspects, since not only maintenance history information and purchase history information, but also expenses associated with this can be processed, vehicle management becomes simpler for both the management side that assesses a charge for the expenses and the client who pays the expenses.

BRIEF DESCRIPTION OF THE DRAWINGS

FIG. 3A is a diagram illustrating an example client information display screen;

FIG. 3B is a diagram illustrating an oil change period display screen;

FIG. 4 is a diagram illustrating an example client management information display screen;

FIG. 5 is a diagram illustrating an example information input screen;

FIG. 6 is a diagram illustrating an example information input screen for individual business destinations;

FIG. 7A is a diagram illustrating an example display screen for maintenance expenses for one kilometer;

FIG. 7B is a diagram illustrating an example display screen for business performance for one kilometer;

FIG. 7C is a diagram illustrating an example display screen for business effects;

FIG. 7D is a diagram illustrating an example display screen for the number of operated vehicles and cost effectiveness;

FIG. 8 is a diagram illustrating an example data comparison screen;

FIG. 11A is a diagram illustrating an example common portion change screen;

FIG. 11B is a diagram illustrating an example client information change screen;

FIG. 12C is a diagram illustrating an example normal charge data selection screen;

FIG. 12D is a diagram illustrating an example client change screen for normal charges;

FIG. 12E is a diagram illustrating an example credit sale change screen for normal charges;

FIG. 13 is a diagram illustrating an example itemized account display screen.

BEST MODES FOR CARRYING OUT THE INVENTION

Figure 1:
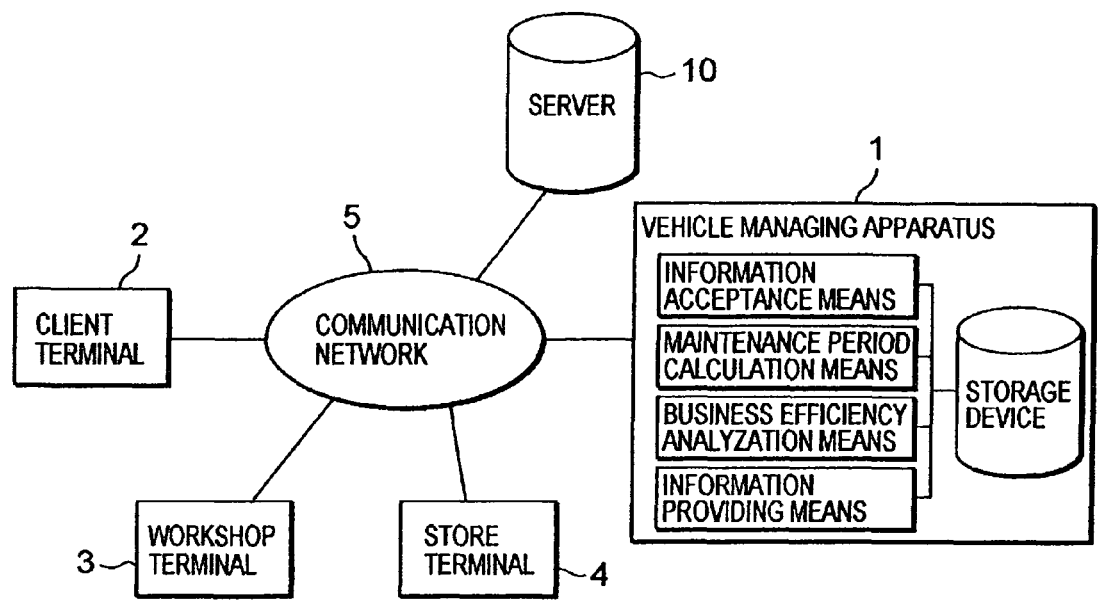
FIG. 1 is a conceptual diagram illustrating a vehicle managing system used for performing a vehicle managing method according to the present invention.

A vehicle managing method according to the present invention is realized using a vehicle managing apparatus operated by a vehicle managing program. The vehicle managing apparatus is connected to a client terminal via a communication network, thereby constructing a vehicle managing system. The general configuration of the vehicle managing system is illustrated in FIG. 1. The vehicle managing system for this embodiment includes a vehicle managing apparatus 1, a client terminal 2, a workshop terminal 3, a store terminal 4 and a server 10, all of which are connected to a communication network 5. For the sake of convenience, only one client terminal 2, one workshop terminal 3 and one store terminal 4 are illustrated; however, in each instance, more than one terminal may be employed.

The vehicle managing apparatus 1, which is provided using a computer that executes a vehicle managing program, includes information acceptance means, maintenance period calculation means, business efficiency analyzation means and information providing means, and is employed by the manager for the vehicle managing system. Here, the manager represents the main body that provides a vehicle management service by using the system.

The computer includes, as constituents, input devices, such as a keyboard and a mouse; an output device, such as a display device; a CPU that sequentially executes instructions issued by the vehicle managing program; a storage device, such as a memory or a hard disk, in which the vehicle managing program, data required for execution of the program and various other information are to be stored; and a communication device that is used to access a communication network. A personal computer or a workstation is employed as the above described computer.

When the vehicle managing program is executed by the computer, the computer performs the functions of various means (information acceptance means, maintenance period calculation means, business efficiency analyzation means and information providing means), i.e., upon receiving an instruction from the CPU, the information acceptance means performs an information acceptance step S1, the maintenance period calculation means performs a maintenance period calculation step S2, the business efficiency analyzation means performs a business efficiency analysis step S3, and the information providing means performs an information providing step S4, and thereby performs the management of a vehicle.

The information acceptance means receives information entered by the vehicle managing apparatus 1, the client terminal 2, the workshop terminal 3 or the store terminal 4, and appropriately stores the information in the storage device. The information to be entered is vehicle maintenance history information, history information for the purchase of automotive accessories, information concerning vehicle operating records for a predetermined period and information related to the business performance of a client for a predetermined period. Here, the maintenance history information is information describing the history of the maintenance, inspections and repairs, such as past inspection dates and oil change dates for a vehicle. Further, the purchase history information is information detailing the history of the types and the prices of automotive accessories purchased from automotive parts and supply vendors. Furthermore, the operating record information is information related to the record of the use of a vehicle, such as the distance traveled and the operating time for the vehicle. In addition, the business performance information is information detailing the results of business activities, such as the name of a trading destination at which a business transaction was involved use of a vehicle, the distance to the destination, the number of visits to the destination and the obtained operating revenue. The predetermined period is to be properly designated, and when one day, for example, is the designated period, the operating record information and the business performance information are entered once a day.

The maintenance period calculation means calculates the next maintenance period for the vehicle based on at least one set of data stored in the storage device, i.e., the maintenance history information, the purchase history information or the operating record information, and stores the obtained results as maintenance period calculation results in the storage device. Here, the maintenance period is a period during which a vehicle should receive various maintenance, inspections and repairs, and for this calculation, there is a case wherein the period should be determined in accordance with established rules, such as laws, and a case wherein the period should be determined from the technical point of view in order to maintain the vehicle in a satisfactory condition. As an example for the first case, the next inspection date is calculated based on the preceding inspection date, and as an example for the second case, the next oil change date is calculated based on the preceding oil change date and the distance traveled.

The business efficiency analyzation means analyzes business efficiency based on at least one set of data stored in the storage device, i.e., the maintenance history information, the purchase history information, the operating record information or the business performance information, and stores the obtained results as business efficiency analysis results in the storage device. Here, the business efficiency is a numerical value representing the employment conditions for a vehicle and the effects obtained by using the vehicle. For example, the maintenance cost for a distance traveled unit is calculated based on the distance traveled, the maintenance costs and the automotive accessories purchase expenses, and the business performance for the distance traveled unit is calculated based on the distance traveled, the maintenance costs and the operating revenue.

The information providing means reads the maintenance period calculation results, the business efficiency analysis results and other data that are stored in the storage device, and transmits the information to the client terminal 2, the workshop terminal 3 and the store terminal 4. At this time, the information to be transmitted is not uniform, and information required for the individual terminals is selected and transmitted.

The client terminal 2 owned by a client employs the communication network 5 to transmit information to the vehicle managing apparatus 1 and to receive information from the vehicle managing apparatus 1, and is provided by using a computer, such as a personal computer. A client does not always have merely a single client terminal 2, and may have more than one client terminals 2. Furthermore, a client terminal 2 may be a cellular phone or a car navigation apparatus.

Moreover, the workshop terminal 3 and the store terminal 4 are respectively possessed by a maintenance workshop and an automotive parts and supply vendor that cooperate with the manager in the construction of the vehicle managing system of the invention. These terminals 3 and 4 employ the communication network 5 to transmit information to the vehicle managing apparatus 1 and to receive information from the vehicle managing apparatus, and are provided using a computer, such as a personal computer.

The communication network 5 is a network that enables the transmission and reception of electronic data, and is constituted by the Internet or a LAN.

An explanation will now be given for a specific processing flow by which the vehicle managing system manages business use vehicles owned by clients.

First, the manager connects the vehicle managing apparatus 1, via the Internet, to the workshop terminal 3 and the store terminal 4, for example, in consonance with contracts entered into with a maintenance workshop and an automotive parts and supply vendor. It should be noted that, at the least, either the maintenance workshop or the automotive parts and supply vendor may be controlled by the same main body as the manager, or the maintenance workshop or the automotive parts and supply vendor may serve in the role of the manager.

In such a case, the vehicle managing apparatus 1, the workshop terminal 3 and the store terminal 4 may be connected by a special network, such as a LAN, or a single computer may be used to function as two or more of the vehicle managing apparatus 1, the workshop terminal 3 and the store terminal 4.

Sequentially, the manager is tasked with making a contract with a client for the management of business use vehicles. The client may thus directly apply to the manager to enter into a contract, or the maintenance workshop or the automotive parts and supply vendor, in cooperation with the manager, may act as an agency for accepting the application. When a contract is to be concluded client information and vehicle information are submitted by the client. Here, the client information is information used to identify the client, such as the name or the title, the address, the telephone number and the email address of the client, and the vehicle information is information used to specifically identify vehicles, such as the makes of the vehicles owned by the client, the model types, the body types, the license registration numbers and the registration years, and information related to the car insurance for the vehicles. The client information and the vehicle information are entered, in correlation with each other, by using the input device of the vehicle managing apparatus 1, the workshop terminal 3 or the store terminal 4, and are stored in the storage device of the vehicle managing apparatus 1. A user ID is allocated for an individual client. A client is not always assigned merely a single user ID, and a number of user IDs may be shared by a like number of members of a client.

The vehicle managing apparatus 1 and the client terminal 2 basically employ a web site and email to exchange information. That is, in a case wherein the manager provides information for the client, the information providing means uploads, to the server 10 on the communication network 5, the address of a web site where the information is included, and the client accesses the web site, using the client terminal 2, and browses the information, or the information providing means transmits, to the client terminal 2, email that includes relevant information. Further, in a case wherein the manager collects information from the client, the information acceptance means uploads, to the server 10 on the communication network 5, a web site where an information input form is present, and the client accesses the web site using the client terminal 2 and enters information to the information input form. A common web site is preferable as the web site where information is included and the web site where an information input form is present. It should be noted that other communication means, such as telephonic or postal communications, may be employed to complement the above described method. The same process is employed for the exchange of information by the vehicle managing apparatus 1 and the workshop terminal 3 or the store terminal 4.

A vehicle managing service using the vehicle managing system is started when the manager establishes a web site whereat client information and vehicle information are stored. That is, the web site whereat the client information and the vehicle information are stored is uploaded to the server 10 on the communication network 5, so that the client can access the web site, using the client terminal 2, and browse the information.

Figure 2A:
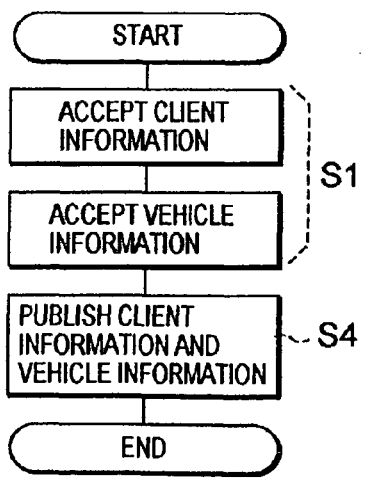
FIG. 2A is a flowchart illustrating the processing performed by a vehicle managing program as one embodiment of the present invention.

The processing flow for the program at this time is as shown in FIG. 2A, i.e., the information acceptance step S1 is performed to accept the client information and vehicle information, and then, the information providing step S4 is performed to upload the web site.

Access to the web site is limited in accordance with a user ID, a password, etc.; the client simply logs in to the web site by entering the user ID and password and can then browse only client related information. In a case wherein the client is a corporation, different user IDs may be allocated to persons in managerial positions and to persons in ordinary clerical positions, in order to provide specific limitations such that a person in a managerial position can browse all the information for the company, whereas a person in an ordinary clerical position can browse only part of the information. Further, at the same time as the providing of information is started, as described above, an information input form is uploaded in order to correct or add client information or vehicle information, and the client may appropriately enter corrected information. The input information is then stored in the storage device by the information acceptance means. An example client information display screen 20 for displaying client information is illustrated in FIG. 3A. Client information 23 for the pertinent client is located below the headline "Client Management Information", on the right of the screen. A client name 21 is displayed on the left of the screen, and buttons are also displayed there for accessing vehicle information, including oil change periods and inspection periods, which will be described later. For example, when an oil change period list button 22 is clicked on, an oil change period display screen 30 (FIG. 3B), which will be described later, is displayed.

A client uses a vehicle, and takes the vehicle to the maintenance workshop for required maintenance, or purchases automotive accessories from the automotive parts and supply vendor. An information input form, in which the workshop enters maintenance history information and the automotive parts and supply vendor enters purchase history information, is uploaded to the server 10.

Each time maintenance is performed at the maintenance workshop, information related, for example, to past inspection dates for the vehicle, the exchange dates for oil and parts and the details and costs for the oil and parts that were exchanged is entered as maintenance history information using the workshop terminal 3. The input information is stored in the storage device by the information acceptance means. The maintenance history information thus stored is held in the web site, so that the workshop and the client can read the information at any time.

Each time a product is sold to a client by the automotive parts and supply vendor, information related, for example, to the types and the prices of automotive accessories purchased of the client from the automotive parts and supply vendor is entered as purchase history information using the store terminal 4. This information may be entered manually, or may be automatically entered by being linked to a POS system. The input information is stored thereafter in the storage device by the information acceptance means. The purchase history information thus stored is held in the web site, so that the automotive parts and supply vendor and the client can browse the information at any time.

When the automotive parts and supply vendor is permitted to browse the maintenance history information and the maintenance workshop is permitted to browse the purchase history information, the information can be employed in common and better customer service can be offered. An example for a client management information display screen 40 that can be browsed by the workshop terminal 3 and the store terminal 4 is illustrated in FIG. 4. A client list 41, client information for the individual clients and buttons 42 for accessing oil change period information and inspection period information, which will be described later, are displayed on the screen below the headline "Client Management Information List".

Furthermore, an information input form, in which the client enters operating record information for each vehicle, is uploaded to the server 10. The client uses a vehicle, and employs the client terminal 2 to enter, as operating record information, information related, for example, to the distance traveled and the time operated for a vehicle for each period of time. This predetermined period of time can be freely designated, and it is preferable that once a day, after work, the record for the day be entered. The input information is stored in the storage device by the information acceptance means, and the operating record information thus stored is held in the web site, so that the client can browse the information at any time.

When the maintenance history information, the purchase history information and the operating record information have been entered, the maintenance period calculation means reads the information from the storage device and calculates the next maintenance period. For example, since for a car an inspection is generally required once every two years, the next inspection date is calculated based on the preceding inspection date. Further, engine oil is generally supposed to be changed in a case wherein three to six months have elapsed or wherein a vehicle has traveled 3000 to 5000 km or longer, and the next oil change date is calculated based on the preceding oil change date and the distance traveled by the vehicle. Other periodical maintenance and the dates for exchanging expendable parts are also calculated in the same manner. These maintenance period calculation results are stored in the storage device.

The next maintenance period calculated is held in the web site so as to be available for transmission to the client. An example for an oil change period display screen 30 used to notify the client of an oil change period is illustrated in FIG. 3B. The left side of the screen is the same as the previous client information display screen 20, and a list 31 is displayed on the right of the screen to represent vehicles owned by the client, and the preceding oil change dates and the next oil change dates for these vehicles. Further, when the days remaining until a fixed date is reached, a predetermined number of days (e.g., 30 days), it is preferable that a message indicating that the next inspection or oil change date is imminent be displayed on the first screen that is displayed after a login to the web site because the client accesses the web site at least once a day to enter operating record information, and will therefore be sure to receive the message. Furthermore, the information providing means requests a warning be forwarded to the client by transmitting an email to the client terminal 2 indicating that a maintenance period is imminent. In addition, together with maintenance period information, data related to maintenance details, an estimate prepared for maintenance costs and the name and the location of a maintenance workshop available for performing the maintenance may be transmitted.

Figure 2B:
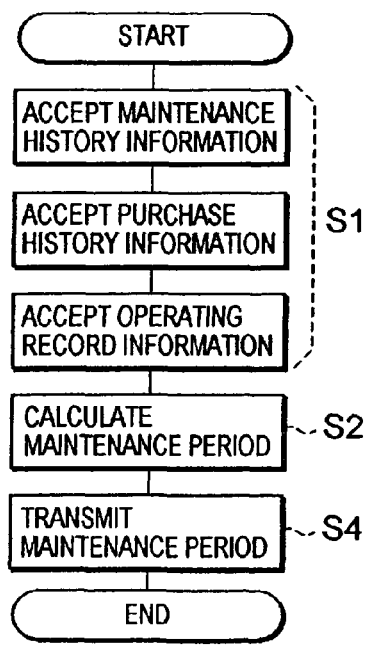
FIG. 2B is a flowchart illustrating the processing performed by the vehicle managing program as one embodiment of the present invention.

The processing flow for a program for transmitting the maintenance period calculation results is as shown in FIG. 2B: the information acceptance step S1 is performed to accept maintenance history information, purchase history information and operating record information; then, the maintenance period calculation step S2 is performed to calculate the next maintenance period based on the above described information sets; and sequentially, the information providing step S4 is performed to transmit a notification of a maintenance period to the client terminal 2.

The client receives a notification including the maintenance period calculation results for a vehicle and takes the vehicle to the maintenance workshop at an appropriate time for the performance of the maintenance. After the maintenance has been performed, the maintenance workshop accesses the web site using the workshop terminal 3 and enters maintenance history information, such as the date, the contents and the maintenance cost, in the information input form. The input maintenance history information is then stored in the storage device, and is also held by the web site, so that the information can be browsed by using the client terminal 2, the workshop terminal 3 or the store terminal 4. Moreover, the maintenance period calculation means calculates the next maintenance period based on the new maintenance history information, and stores the obtained period in the storage device.

As described above, according to the vehicle managing system of this mode, since the client can always take a vehicle to the maintenance workshop at an appropriate time for the performance of the maintenance, as a result, the service life of the vehicle can be extended, and an increase in the costs required for maintenance and management of the vehicle can be prevented. Furthermore, the vehicle managing system provides a service for analyzing business efficiency in the following manner.

First, an information input form is uploaded to the server 10 in order to permit a client to enter business performance information. After having concluded a business transaction that required the use of a vehicle, the client employs the client terminal 2 to enter, as business performance information for each predetermined period, information such as working hours, which indicate the time during which the client was on duty, actual working hours, which indicate the time during which the client engaged in a negotiation, etc., at a business destination, the name of and the distance to a business destination where the client engaged in a business transaction requiring use of the vehicle, the number of visits and the operating revenue thus acquired. This predetermined period can be freely designated, and it is preferable that once a day, after work, the performance for the day be entered, at the same time as the operating record information. The input information is thereafter stored in the storage device by the information acceptance means, but since the business performance information thus stored is held by the web site, the client can browse the information at any time. At this time, in a case wherein the client is a corporation, a limitation may be imposed such that with a user ID assigned to a person in a managerial position, information for all vehicles can be browsed, while with a user ID assigned to a person in an ordinary clerical position, only information for his or her vehicle can be browsed.

An example information input screen 50 displayed in FIG. 5 can be used for the entry of business performance information and the above described operating record information. A client name 51 is displayed in the top portion of the screen, and vehicle information 52 is displayed under the client name 51. Further, an input form 53 is displayed below the vehicle information 52 that permits the entry of various information for each day. Buttons 54, provided in the bottom portion of the screen, are used to display a menu screen and an individual business destination information input screen 60 (FIG. 6), business analysis display screens 70, 80, 90 and 100 (FIGS. 7A to 7D) and a data comparison screen 110 (FIG. 8), all of which will be described later. Furthermore, an example individual business destination information input screen 60 is shown in FIG. 6 in order to enter the distances to individual business destinations and the resulting operating revenues, which are also included in the business performance information, and information for the individual business destinations can be entered in an input form 61.

When the maintenance history information, the purchase history information, the operating record information and the business performance information have been entered, the business efficiency analyzation means reads these data from the storage device and calculates individual values using the following expression. The calculation results are then stored in the storage device.

Expression (1) is an expression used for calculating a maintenance cost for one kilometer. Here, the maintenance cost is the total of the costs required for inspections and repairs performed by a maintenance workshop within a specified period of time and the money that was paid to automotive parts and supply vendors for automotive accessories, and the distance traveled is the distance a vehicle traveled during the specified period of time. For example, when this value is excessive, although a vehicle is new, it is assumed that there is a problem in the way the vehicle has been operated, e.g., driving is rough, or when this value increases as a vehicle ages, this can be employed as a reference to determine whether replacement of the vehicle is required.

$$\text{Maintenance cost for one kilometer} = \text{maintenance cost/distance traveled} \quad (1)$$

Expression (2) is an expression used for calculating business performance for one kilometer. Here, business performance indicates the results obtained by using a target vehicle for the same period of time as that allocated for the maintenance cost and distance traveled, i.e., represents sales figures or the amount of goods sold. By referring to this value, the level of the contribution attributable to each vehicle, relative to sales results, can be obtained, and in a case wherein the vehicle is regularly employed by the same person, this value may also be used to evaluate the business performance contribution of that person. Further, when this value is referred to while comparing usage factors for different vehicle types, which vehicle type is appropriate for a pertinent operation can also be a factor that is discussed.

$$\text{Business performance for one kilometer} = (\text{business performance} - \text{maintenance cost})/\text{distance traveled} \quad (2)$$

Expression (3) is an expression for calculating business effectiveness. Here, operating revenue is that revenue obtained at individual business destinations by using a target vehicle during the same period of time as allocated to the maintenance cost and distance traveled, i.e., represents sales figures or the amount of goods sold. Furthermore, distance refers to the distance from the starting point, at the business place of the client, to an individual business destination. Further, the number of visits is the number of times visits were made to an individual business destination during the pertinent period of time. This value is a ratio of the revenue obtained at a specific business destination relative to the costs incurred by use of the vehicle, and is employed as a reference for determining a business destination to be visited on a priority basis.

$$\text{Business effectiveness} = \text{operating revenue}/\text{maintenance cost for one kilometer} \times \text{distance} \times \text{the number of visits} \quad (3)$$

Expression (4) is an expression for calculating a number of operated vehicle. Here, operating hours is the time an individual vehicle was actually operated during a specified period of time, and the total operating hours is the total of the operating hours for all the vehicles owned by a client. In addition, working hours is a time during which a client employee was on duty during the pertinent period of time, and the total working hours is a value obtained by multiplying the number of vehicles by the working hours. In a case wherein a person regularly employs the same vehicle, working hours are defined for each vehicle, and the total number of hours becomes the total working hours. This value represents the time vehicles are actually operated, relative to the working hours, and is employed as a reference to determine whether the number of vehicles is appropriate for the business operation of the client.

$$\text{Number of operated vehicles} = \text{total operating time}/\text{total working hours} \quad (4)$$

Expression (5) is an expression for calculating cost effectiveness. Here, actual working hours is a period during which a client employee engaged in negotiations, etc., at a business destination, and the sum of the operating time and the actual working hours becomes a period extending from the time departed on business until the time returned to the office. This value represents the costs for the period during which the vehicle was used, and when this value is compared for individual vehicles, the characteristic for each vehicle becomes obvious.

$$\text{Cost effectiveness} = \text{maintenance costs} + \text{actual working hours} \quad (5)$$

The information providing means reads the obtained business efficiency analysis results from the storage device and uploads the results to the server 10, so that these results are transmitted to the client. The client accesses the web site using the client terminal 2 at an appropriate time, and browses the information. Example analysis results display screens 70, 80, 90 and 100 are shown in FIGS. 7A to 7D, on which the individual results obtained for business efficiency analyses are displayed. The display screen 70, for a maintenance cost for one kilometer, is shown in FIG. 7A, and a distance traveled, a maintenance cost and a maintenance cost for one kilometer are displayed for each vehicle. The display screen 80, for the business performance for one kilometer, is shown in FIG. 7B, and the distance traveled, the business performance, the maintenance costs for one kilometer and the business performance for one kilometer are displayed for each vehicle. The display screen 90 for business effectiveness is shown in FIG. 7C, and the maintenance costs for one kilometer for a vehicle, the distance to an individual business destination, and the number of visits, operating revenue and business effectiveness obtained for an individual business destination are displayed. The display screen 100 for a vehicle operation rate and the cost effectiveness is shown in FIG. 7D, and an operating period and the working hours and the total time for these two periods, the number of operated vehicle, a maintenance cost and the cost effectiveness are displayed for each vehicle. Further, the information providing means may transmit, to the client terminal 2, an email that includes the above described business efficiency analysis results. In a case wherein a client is a corporation, a limitation may be imposed such that the business efficiency analysis results can be browsed by using the user ID of a person in a managerial position, but not by using the user ID of a person in an ordinary clerical position.

Figure 2C:
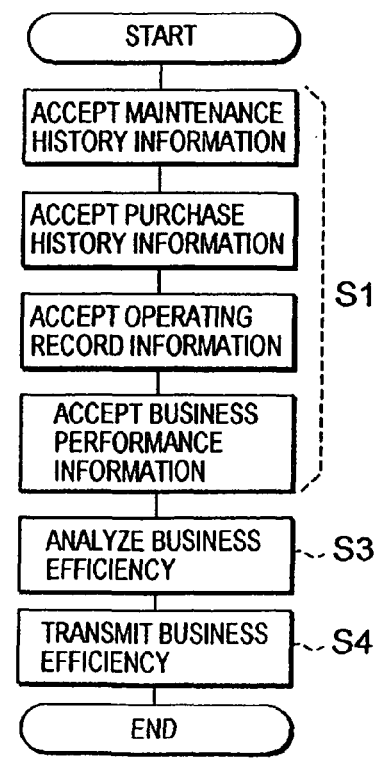
FIG. 2C is a flowchart illustrating the processing performed by the vehicle managing program as one embodiment of the present invention.

The above described processing flow for a program used to transmit business efficiency analysis results is performed in the manner as shown in FIG. 2C, i.e., the information acceptance step S1 is performed to accept maintenance history information, purchase history information, operating record information and business performance information, then, the business efficiency analysis step S3 is performed and the business efficiency is analyzed by substituting the above described individual sets of information into the individual expressions, and sequentially, the information providing step S4 is performed to transmit the business efficiency analysis results to the client terminal 2.

Since the information related to business efficiency is stored in the server 10, the client can employ the client terminal 2 and browse past information at arbitrary times. At such a time, the client can browse the status of a change from the past up to the present, or can compare data for a specific period with data for a like prior period. An example data comparison screen 110, illustrated in FIG. 8, is used to compare business efficiency analysis data for a specific period with data for a like prior period. In this embodiment, data are compared using numerical values; however, diagrams such as graphs may be displayed for such a comparison.

Figure 9:
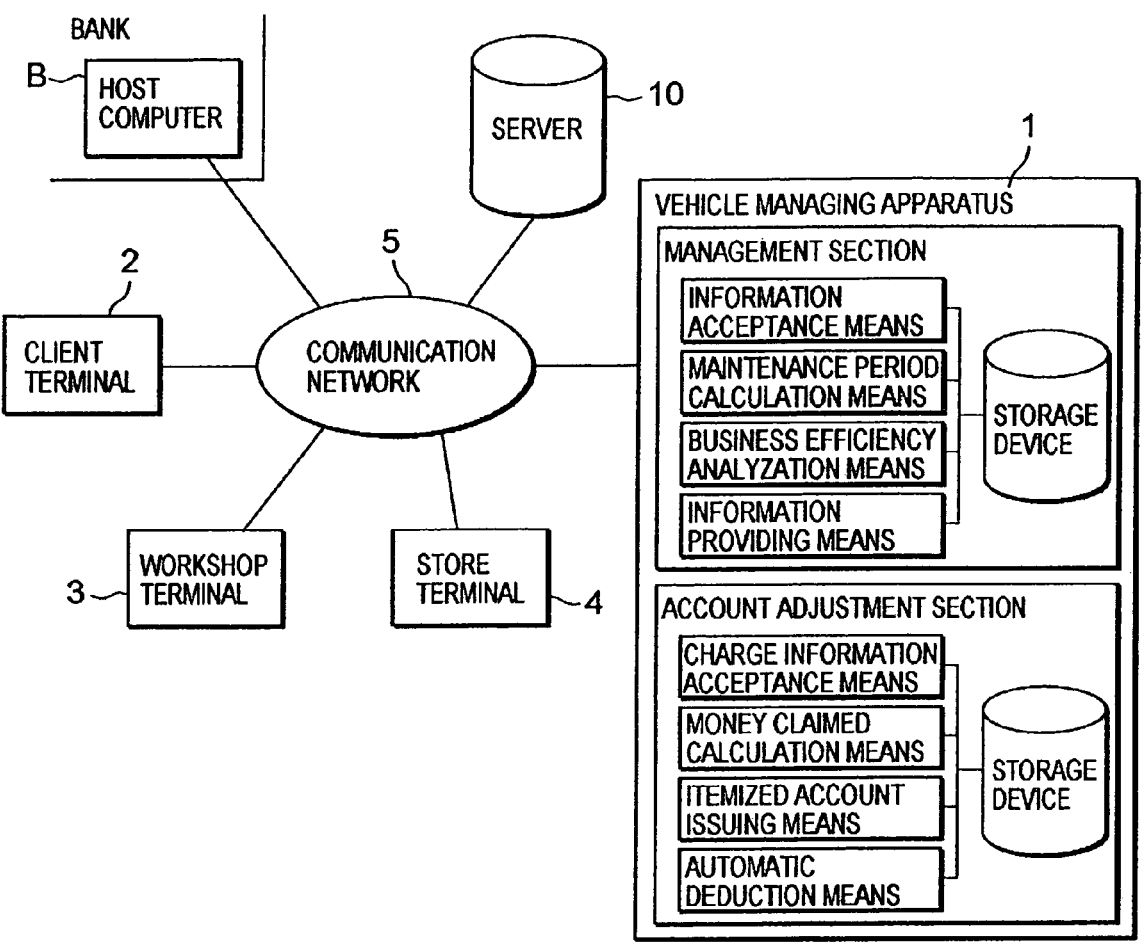
FIG. 9 is a conceptual diagram illustrating a vehicle managing system that includes a second mode for the vehicle managing apparatus.

Next, an explanation will be given for a second mode of the present invention wherein an account adjustment section, for adjusting an account, is provided for the above described vehicle managing apparatus. The general configuration of a vehicle managing system that includes the second mode for the vehicle managing apparatus 1 is illustrated in FIG. 9. The vehicle managing apparatus 1 of this invention includes a management section that performs the previously described vehicle management, and an account adjustment section that performs an account adjustment, which will be described later, and this apparatus is connected to a communication network 5. A host computer B of a bank is also connected to the communication network 5 in order to perform the account adjustment process. A client terminal 2, a workshop terminal 3 and a store terminal 4 are arranged in the same manner as previously described. Referring to the drawing, the vehicle managing apparatus 1 includes the management section and the account adjustment section, each of which includes a storage device; however, these sections may actually be provided as two separate hardware units, or may be arranged in a single hardware unit and share a storage device. Further, it is assumed that, in a case wherein the management section and the account adjustment section are separately provided, the two sections will still be able to freely exchange information.

For the vehicle managing apparatus of this mode, since the function of the management section is the same as previously described, no further description for it will be given. The function of the account adjustment section will now be described, while assuming that, for a client who employed a vehicle, maintenance of the vehicle was performed and automobile accessories was purchased, so that maintenance history information and purchase history information are stored in the storage device.

When a computer executes a vehicle managing program, the computer performs the functions of a variety of means (charge information acceptance means, money claimed calculation means, itemized account issuing means and automatic deduction means), i.e., upon receiving an instruction from a CPU, the charge information acceptance means performs a charge information acceptance step S5; the money claimed calculation means performs an money claimed calculation step S6; the itemized account issuing means performs an itemized account issuing step S7; and the automatic deduction means performs an automatic deduction step S8, so that the adjustment of an account is performed.

The charge information acceptance means receives information entered at the vehicle managing apparatus 1 and properly stores the information in the storage device. The input information is account information used for an automatic deduction and information for a date for the settlement of accounts. Here, account information is information, such as a bank name, a branch name and an account number, and information for which both the account of a manager and the account of a client is required. Furthermore, information for a date for settlement of accounts is information for designating, for each client, the twentieth of the month or the end of the month for the settlement of accounts.

The money claimed calculation means employs, at the least, either the maintenance history information or the purchase history information, stored in the storage device, to calculate the amount of money that a client should pay, and stores in the storage device the obtained results as money claimed calculation results. In this case, the total of the costs for maintenance paid by the client during a predetermined period and a cost for automotive accessories purchased by the client becomes the amount of money that should be charged the client.

The itemized account issuing means reads the money claimed calculation results stored in the storage device, and prepares an itemized account and transmits it to the client terminal. Columns for a purchase date, a product name, a product number, a quantity and a price are included in the itemized account, and the contents of the maintenance performed for the client and products purchased by the client during the predetermined period can be viewed. The client can browse the itemized account using the client terminal, and the itemized account may be separately transmitted by mail.

The automatic deduction means reads the account information, the information for a date for the settlement of accounts and the money claimed calculation results that are stored in the storage device, and prepares direct debit information in order to automatically deduct the money claimed from the bank account of the client. The direct debit information includes a client name, the amount of money claimed, a direct debit date, etc., and is formed using a format consonant with the system of the bank at which the client has an account.

Figure 10:
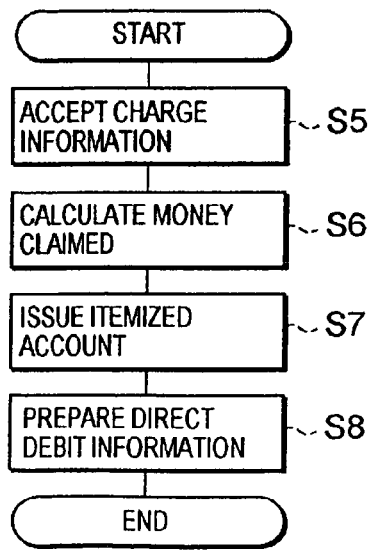
FIG. 10 is a flowchart illustrating the processing performed by the program of an account adjustment section.

The processing performed for a program at this time is as shown in FIG. 10, i.e., a charge information acceptance step S5 is performed to accept account information and account settlement information, and an money claimed calculation step S6 is performed, at which the amount of money to be charged the client is calculated, based on maintenance history or purchase history data. Then, sequentially, an itemized account issuing step S7 is performed to issue an itemized account, and thereafter, an automatic deduction step S8 is performed to prepare data for the automatic withdrawal of money charged from the bank account of the client.

When an account is actually to be adjusted using this system, a special input/output form is uploaded to a server 10. Permission to access this input/output form, however, is limited, and requires the entry of a valid user ID and password; thus, a manager having a valid user ID and password is permitted to log in and enter or browse data. It should be noted that only the manager is authorized to access the input/output form, and the client can browse only an itemized account that will be described later. When the input/output form is logged in, a menu 201 is displayed on the left of the screen, as shown in FIG. 11A. On the menu 201, buttons are arranged to display a common portion change screen and a client information change screen, which will be described later, and when, for example, a common portion change screen button 202 is clicked on, a common portion change screen 200 is displayed on the right of the screen (FIG. 11A illustrates the state after the common portion change screen display button 202 was clicked on). First, on the common portion change screen 200, the manager enters his or her (company) account information. On the common portion change screen 200, a form is displayed for entering information, such as the names of a transaction bank and a branch and the account number, that is required for a transaction with the bank. Generally, once this information has been entered at the start of the operation of the system, the entry of the information is no longer required.

Following this, an example for a client information change screen 210 is illustrated in FIG. 11B. The client information change screen 210 is displayed by entering a client number in a number input form 211 on the menu and clicking on a client information change screen display button 212. In this case, information is entered that includes the name of a bank, the name of a branch and an account number of a client for an automatic deduction, and a date for the settlement of an account, such as the twentieth of a month or the end of a month, is entered. This information must be entered for each client.

Figure 12A:
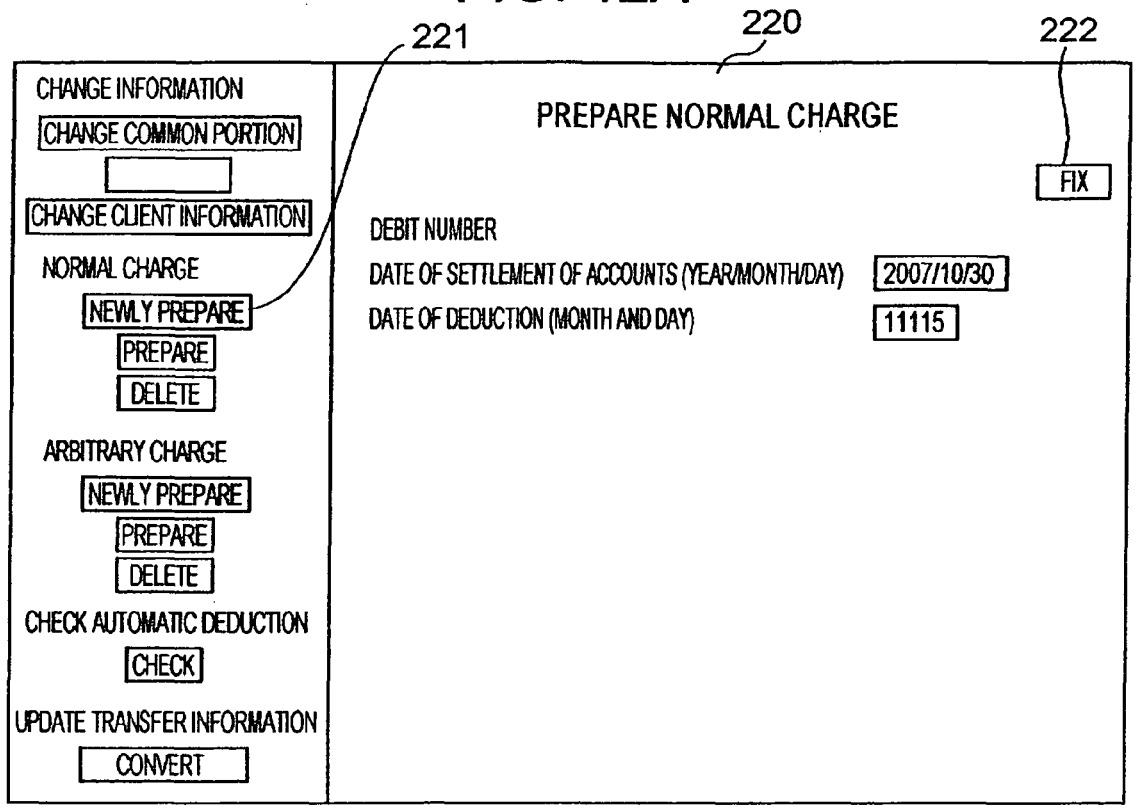
FIG. 12A is a diagram illustrating an example preparation screen for new normal charges.
Figure 12B:
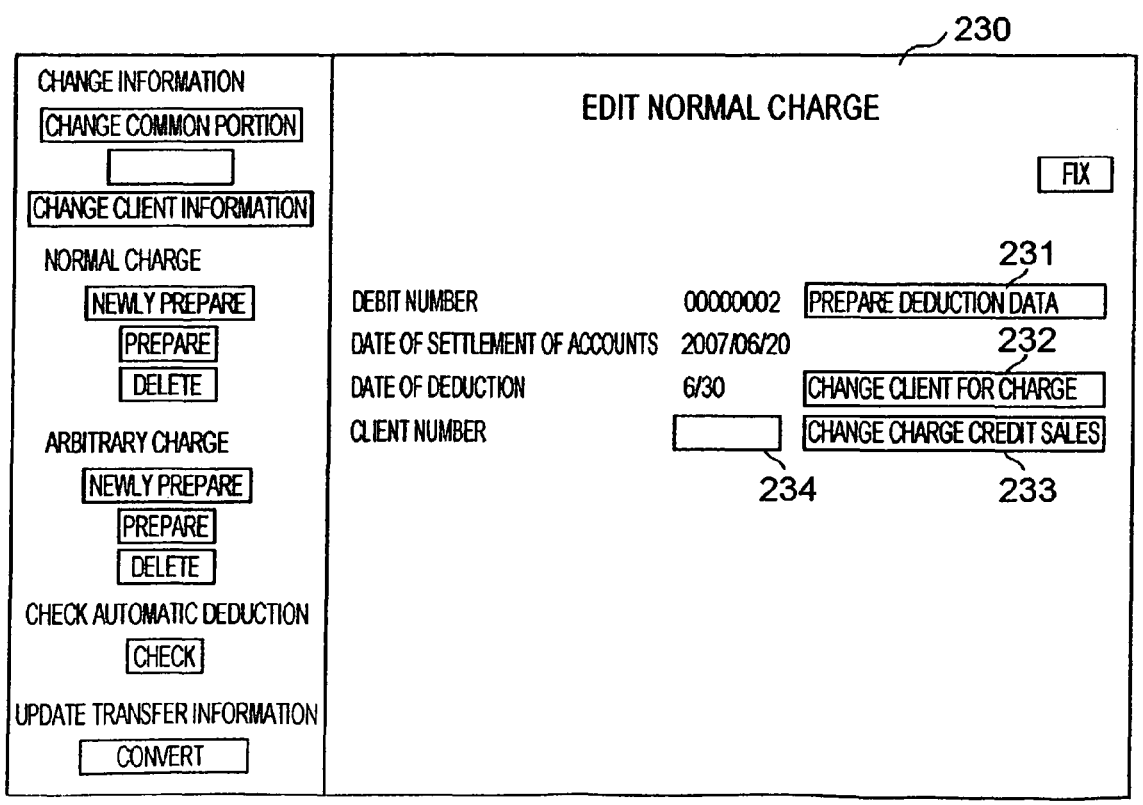
FIG. 12B is a diagram illustrating an example normal charge editing screen.

As described above, when the account information, etc., has been input for the manager and the client, an account adjustment can be sequentially performed. First, in a case wherein an account adjustment is to be newly performed, a new preparation button 221 on the menu for a normal charge is clicked on and a normal charge preparation screen 220 is displayed (FIG. 12A). Here, a normal charge is a periodical charge issued monthly or once each specified period. In this case, an account settlement date for a charge (year, month and day) and an automatic deduction date (month and day) are designated. When a fix button 222 is clicked on, a debit number is provided for a newly prepared charge, and for a client correlated with the designated date for the settlement of an account, the money claimed calculation means reads maintenance history information or purchase history information from the storage device, calculates the amount of money to be charged the client, and stores the money claimed in the storage device. Then, the screen is shifted to a normal charge editing screen 230 (FIG. 12B). Further, for a charge that was previously prepared, a debit number is simply entered in the number input form on the menu, and a normal charge preparation button 241 is clicked on, so that a normal charge data selection screen 240 is displayed (FIG. 12C) and can be shifted to the normal charge editing screen 230.

On the normal charge editing screen 230, first, when a charged client change button 232 is clicked on, a normally-charged client change screen 250 is displayed (FIG. 12D). In this case, the list of clients that are to be processed on the date for the settlement of accounts is displayed. When a check mark is removed from a settlement account date column 251 for a client, the process is not to be performed for the pertinent client.

Further, when a client number is entered on the client number input form 234 of the normal charge editing screen 230 and a charge credit sales button 233 is clicked on, a normal charge credit sales change screen 260 is displayed (FIG. 12E). In this case, a list of credit sales for which a process is to be performed on the pertinent date for the settlement of accounts is displayed. When a check mark is removed from a settlement account date column 261, the process is not to be performed for the pertinent credit sales.

When, in this manner, an exceptional client or credit sales is designated for which a charge calculated by the money claimed calculation means is not to be processed, the itemized account issuing means prepares an itemized account. This is prepared like a general debit note, as shown on an itemized account display screen 270 in FIG. 13, and purchase dates, product names, product numbers and prices are shown. This itemized account may be transmitted to a client via the communication network 5, so that the client can browse the itemized account using the client terminal 2, or printed matter may be transmitted separately by mail.

When the client has read the itemized account and has verified the contents, and thereafter clicks on a direct debit data preparation button 231 on the normal charge editing screen 230 (FIG. 12B), the automatic deduction means reads the money claimed calculation results stored in the storage device and the above described designated exception, and prepares direct debit information that includes a client name, an amount of money and a deduction date. In addition to a normal charge prepared periodically, a charge can also be arbitrarily prepared. In this case, a charge is prepared based on an arbitrary charge on the menu; since this method is the same as that for a normal charge, no further explanation will be given.

The direct debit information thus prepared may be transmitted directly to the host computer B of a bank via the communication network 5 to request a deduction process, or may be transmitted to the bank using a medium, such as a magnetic disk, to request a deduction process.

Figure 14:
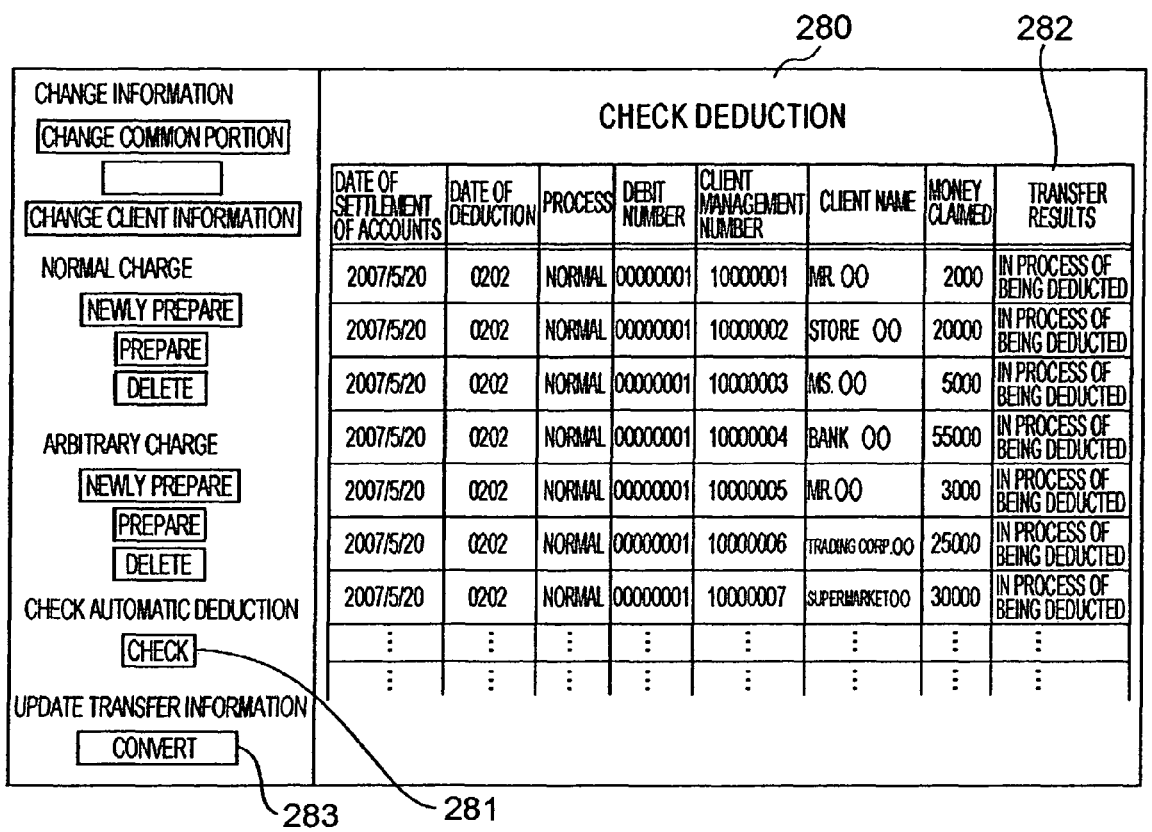
FIG. 14 is a diagram illustrating an example deduction check screen.

When the deduction process is completed, a notification to that effect is accepted from the bank, and data for the process results is received. When a convert button 283 on the menu is clicked on, the received data is converted into the format of the managing system, and when a deduction check button 281 on the menu is clicked on, a deduction check screen 280 is displayed (FIG. 14). In this case, a date of settlement of accounts, a deduction date, a client name and an amount of money are enumerated, and transfer results 282 therefore are displayed. As shown in the drawing, the status of a deduction currently being processed and the status of other deductions for the past year can be examined. Further, the transfer results 282 in the display are linked with corresponding itemized accounts, and when a transfer result 282 is clicked on, the corresponding itemized account display screen 270 is displayed (FIG. 13).

As described above, according to the vehicle managing method of this invention, the manager uniformly manages a variety of information related to vehicles owned by clients, and efficiently provides service data, e.g., transmits necessary information at an appropriate time. Further, instead of simply performing maintenance scheduling and management of vehicles, the manager can totally support the vehicles of clients by providing assistance for various operating aspects, e.g., providing a consulting service based on data acquired while providing vehicle maintenance and management. Furthermore, the client can access a web site and browse information for a vehicle, such as maintenance history, at any time, and since the client receives maintenance period notifications by email, the client ensures that maintenance is always performed at appropriate times, thereby eliminating the need for management labor, and as a result, the service life of vehicles can be extended and monetary obligations reduced. In addition, business efficiency can be analyzed from a viewpoint differing from the conventional one, i.e., the cost effectiveness of an individual vehicle is calculated based on the expenses required for the vehicle, the business performance, etc., and the client can browse the analysis information and employ the information as a reference for determining an appropriate number of units and an appropriate operation method. Since the client can also read at a glance all the costs required for the maintenance and management of a vehicle and information related to a vehicle insurance, it is also very convenient for evaluating general affairs or accounting aspects. Moreover, since the account adjustment section is included, expenses associated with a maintenance history or a purchase history can also be processed in correlation with information related to the maintenance or purchase history, and vehicle management can be made more convenient both for a manager who charges an expense and for a client who receives a charge.

It should be noted that in a case wherein the client terminal 2 is a car navigation system, the vehicle managing apparatus 1 may include a function that, based on position information for a vehicle, transmits a notification to the client terminal 2, indicating location information for the maintenance workshop or the automotive parts and supply vendor that is nearest the vehicle.

Further, a service may be provided to award points to a client in accordance with a cost for the maintenance or a purchase price of automotive accessories. That is, when the client has had maintenance performed at a workshop or has purchased goods at an automotive parts and supply vendor, points are awarded at a fixed rate based on the money paid (e.g., one point for every 100 yen), and the accumulated points are converted, at a fixed rate (e.g., one yen for every one point), into an amount of money that can be used to pay the charge for the performance of the following maintenance or for goods that is purchased. As for the award of a point, the workshop terminal 3 or the store terminal 4 may include point awarding means, and the information acceptance means of the vehicle managing apparatus 1 may receive points that were provided in consonance with the amount of money, and store the points in the storage device. Or, the vehicle managing apparatus 1 may include point awarding means, and points that were awarded in consonance with the amount of money, which is included in the maintenance history information or the purchase history information accepted by the information acceptance means, may be stored in the storage device. Further, it is preferable that points awarded to a client be held in a web site, so that the client can use the client terminal 2 to read the point count at any time. Since the vehicle managing system of this invention operates most efficiently when the client employs workshops and automotive parts and supply vendors that cooperate with the manager, the employment of a point awarding service in the above described manner can encourage clients to use these workshops and automotive parts and supply vendors.

In addition, a card on which client information, vehicle information, etc., is recorded may be issued for each client vehicle. In this case, a device for reading and writing information on such a card is additionally provided for the workshop terminal 3 and the store terminal 4, and a client may be identified by reading information on the card when the client visits one of these terminals. Furthermore, information related to the above described points, etc., may be written on the surface of the card.

The invention claimed is:

1. A vehicle managing method, which is to be performed by a vehicle managing apparatus that is connected to a client terminal of a client via a communication network, for managing one or more business use vehicles owned by the client, comprising:

an information acceptance step for receiving maintenance history information for said vehicles and purchase history information for automotive accessories, operating record information for said vehicles associated with a predetermined period and business performance information for the client associated with the predetermined period, and for storing the information;

a maintenance period calculation step for calculating a maintenance period for each of said vehicles by employing at least one piece of stored information, the stored information including any of the maintenance history information, the purchase history information and the operating record information, and for storing the obtained maintenance period calculation results;

a business efficiency analyzation step for analyzing business efficiency by employing a combination of plural pieces of the stored information, and for storing the obtained results as business efficiency analysis results; and an information providing step for reading the maintenance period calculation results and the stored business efficiency analysis results, and for transmitting these results to the client terminal;

wherein said maintenance history information includes maintenance costs of said vehicles in a predetermined period of time, said purchase history information includes prices of automotive accessories purchased in a predetermined period of time, a sum of said maintenance costs and said prices being a maintenance cost, said operating record information includes distance traveled by said vehicles in a predetermined period of time and operating time of said vehicles, said business performance information includes business performance which corresponds to sales figures obtained by the use of said vehicles in a predetermined period of time, operating revenue which corresponds to a revenue obtained at individual business destination by the use of said vehicles, a distance to an individual business destination, number of visits made to an individual business destination, and actual working hours for which said client has made business operation at an individual business destination;

wherein in said business efficiency analyzation step, maintenance cost per unit distance, business performance per unit distance, business effectiveness, number of operated vehicles and cost effectiveness are obtained by utilizing the following equations, respectively:

Maintenance cost per unit distance=maintenance cost/distance traveled,

Business performance per unit distance=(business performance−maintenance cost)/distance traveled, Business effectiveness=operating revenue/(maintenance cost per unit distance×distance×the number of visits), Number of operated vehicles=total operating time/total working hours, and Cost effectiveness=maintenance costs/(operating time+actual working hours).

2. The vehicle managing method according to claim 1, further comprising:

a charge information acceptance step for receiving information concerning a bank account used for automatic deduction and information concerning a date for settlement of accounts, and for storing the information;

a money claimed calculation step for calculating an amount of money that the client should pay on the basis of at least one piece of stored information which is either the maintenance history information or the purchase history information, and for storing the results as money claimed calculation results;

an itemized account issuing step for reading the stored money claimed calculation results, and for transmitting the money claimed calculation results, as an itemized account, to the client terminal; and an automatic deduction step for reading the stored money claimed calculation results, and for preparing direct debit information in order to automatically deduct the money claimed from the bank account of the client.

3. A vehicle managing apparatus, which is connected to a client terminal of a client via a communication network to manage one or more business use vehicles owned by the client, comprising:

information acceptance unit for receiving maintenance history information for said vehicles and purchase history information for automotive accessories, operating record information for said vehicles associated with a predetermined period and business performance information for the client associated with the predetermined period, and for storing the information in a storage device;

maintenance period calculation unit for calculating a maintenance period for each of said vehicles by employing at least one piece of information stored in the storage device, the stored information including the maintenance history information, the purchase history information or the operating record information, and for storing the obtained maintenance period calculation results in the storage device;

business efficiency analyzation unit for analyzing business efficiency on the basis of, a combination of plural pieces of information from among the maintenance history information, the purchase history information, the operating record information and business performance information stored in the storage device, and for storing the obtained results as business efficiency analysis results in the storage device; and information providing unit for reading the maintenance period calculation results and the business efficiency analysis results, which are stored in the storage device, and for transmitting these results to the client terminal;

wherein said maintenance history information includes maintenance costs of said vehicles in a predetermined period of time, said purchase history information includes prices of automotive accessories purchased in a predetermined period of time, a sum of said maintenance costs and said prices being a maintenance cost, said operating record information includes distance traveled by said vehicles in a predetermined period of time and operating time of said vehicles, said business performance information includes business performance which corresponds to sales figures obtained by the use of said vehicles in a predetermined period of time, operating revenue which corresponds to a revenue obtained at individual business destination by the use of said vehicles, a distance to an individual business destination, number of visits made to an individual business destination, and actual working hours for which said client has made business operation at an individual business destination;

wherein said business efficiency analyzation unit obtains maintenance cost per unit distance, business performance per unit distance, business effectiveness, number of operated vehicles and cost effectiveness per the following equations, respectively, whereby:

Maintenance cost per unit distance=maintenance cost/distance traveled,

Business performance per unit distance=(business performance−maintenance cost)/distance traveled, Business effectiveness=operating revenue/(maintenance cost per unit distance×distance×the number of visits), Number of operated vehicles=total operating time/total working hours, and Cost effectiveness=maintenance costs/(operating time+actual working hours).

4. The vehicle managing apparatus according to claim 3, comprising:

charge information acceptance unit for receiving information concerning a bank account used for automatic deduction and information concerning a date for settlement of accounts, and for storing the information in the storage device;

money claimed calculation unit for calculating an amount of money that the client should pay on the basis of at least one piece of information which is either the maintenance history information or the purchase history information both stored in the storage device, and for storing the results as money claimed calculation results in the storage device;

itemized account issuing unit for reading the money claimed calculation results stored in the storage device, and for transmitting the money claimed calculation results, as an itemized account, to the client terminal; and automatic deduction unit for reading the money claimed calculation results stored in the storage device, and for preparing direct debit information in order to automatically deduct the money claimed from the bank account of the client.

5. A computer system including a vehicle managing program to be operated by said computer system, which manages one or more business use vehicles owned by a client and which permits said computer system to function as a vehicle managing apparatus, connected to a client terminal of the client via a communication network, to perform:

an information acceptance step (S1) for receiving maintenance history information for said vehicles and purchase history information for automotive accessories, operating record information for said vehicles associated with a predetermined period and business performance information for the client associated with the predetermined period, and for storing the information;

a maintenance period calculation step (S2) for calculating a maintenance period for each of said vehicles by employing at least one piece of information stored, the stored information including any of the maintenance history information, the purchase history information and the operating record information, and for storing the obtained maintenance period calculation results;

a business efficiency analyzation step (S3) for analyzing business efficiency on the basis of a combination of plural pieces of information from among the maintenance history information, the purchase history information, the operating record information and business performance information, and for storing the obtained results as business efficiency analysis results; and an information providing step (S4) for reading the maintenance period calculation results and the business efficiency analysis results, which are stored, and for transmitting these results to the client terminal;

wherein said maintenance history information includes maintenance costs of said vehicles in a predetermined period of time, said purchase history information includes prices of automotive accessories purchased in a predetermined period of time, a sum of said maintenance costs and said prices being a maintenance cost, said operating record information includes distance traveled by said vehicles in a predetermined period of time and operating time of said vehicles, said business performance information includes business performance which corresponds to sales figures obtained by the use of said vehicles in a predetermined period of time, operating revenue which corresponds to a revenue obtained at individual business destination by the use of said vehicles, a distance to an individual business destination, number of visits made to an individual business destination, and actual working hours for which said client has made business operation at an individual business destination;

and, wherein said business efficiency analyzation step obtains maintenance cost per unit distance, business performance per unit distance, business effectiveness, number of operated vehicles and cost effectiveness by utilizing the following equations, respectively, whereby:

Maintenance cost per unit distance=maintenance cost/distance traveled,

Business performance per unit distance=(business performance−maintenance cost)/distance traveled, Business effectiveness=operating revenue/(maintenance cost per unit distance×distance×the number of visits), Number of operated vehicles=total operating time/total working hours, and Cost effectiveness=maintenance costs/(operating time+actual working hours).

6. The computer system according to claim 5, which permits said computer system to function as the vehicle managing apparatus to further perform:

a charge information acceptance step (S5) for receiving information concerning a bank account used for automatic deduction and information concerning a date for settlement of accounts, and for storing the information;

a money claimed calculation step (S6) for calculating an amount of money that the client should pay on the basis of at least one piece of stored information which is either the maintenance history information or the purchase history information, and for storing the results as money claimed calculation results;

an itemized account issuing step (S7) for reading the stored money claimed calculation results, and for transmitting the money claimed calculation results, as an itemized account, to the client terminal; and an automatic deduction step (S8) for reading the stored money claimed calculation results, and for preparing direct debit information in order to automatically deduct the money claimed from the bank account of the client.

* * * * *